B. G. WORTHINGTON.
CAN OPENER.
APPLICATION FILED MAY 21, 1919.
1,364,016.
Patented Dec. 28, 1920.
2 SHEETS—SHEET 1.
Fig. 1.
Fig. 2.
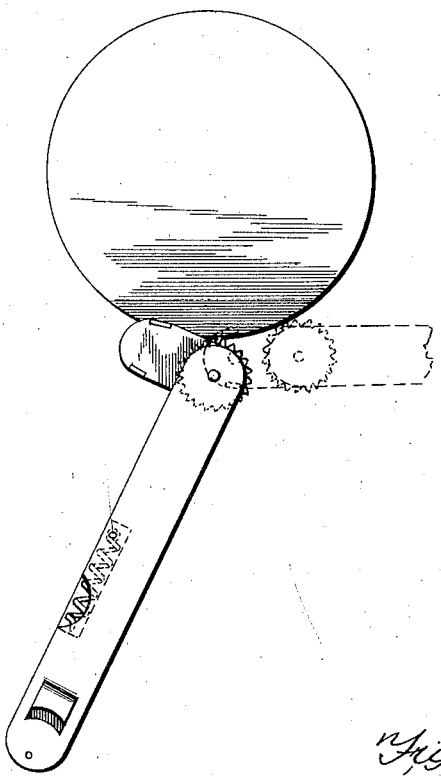
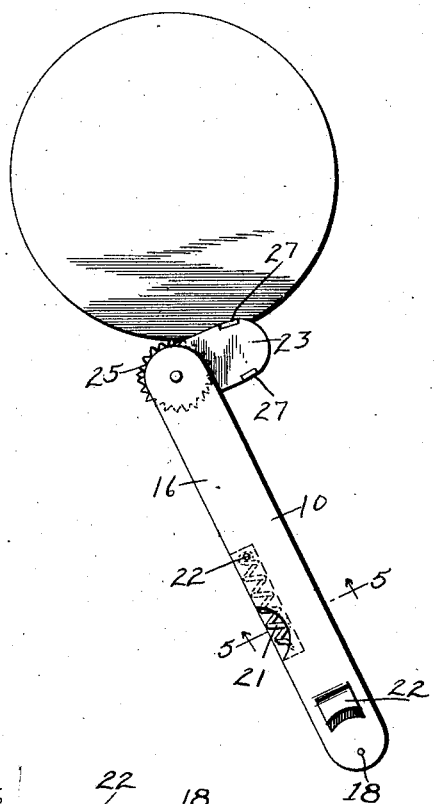
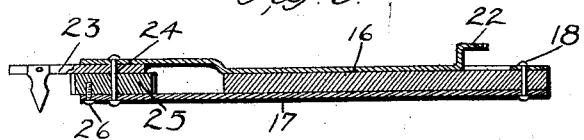
Fig. 3.
Fig. 4.
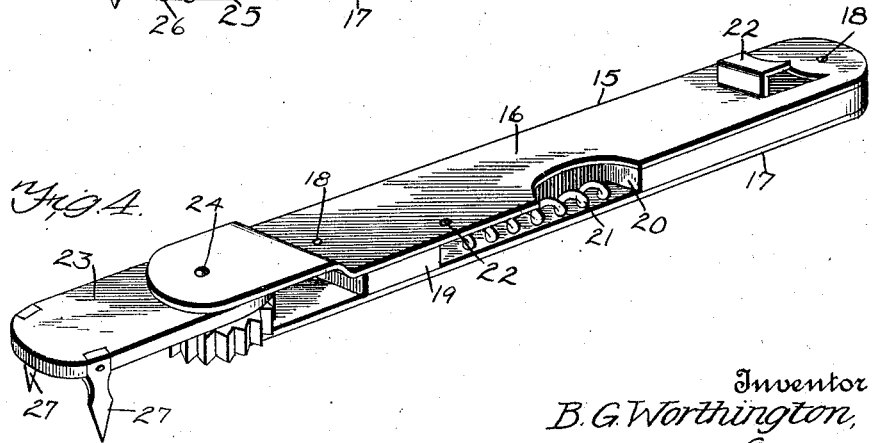
Inventor
B. G. Worthington,
Attorneys

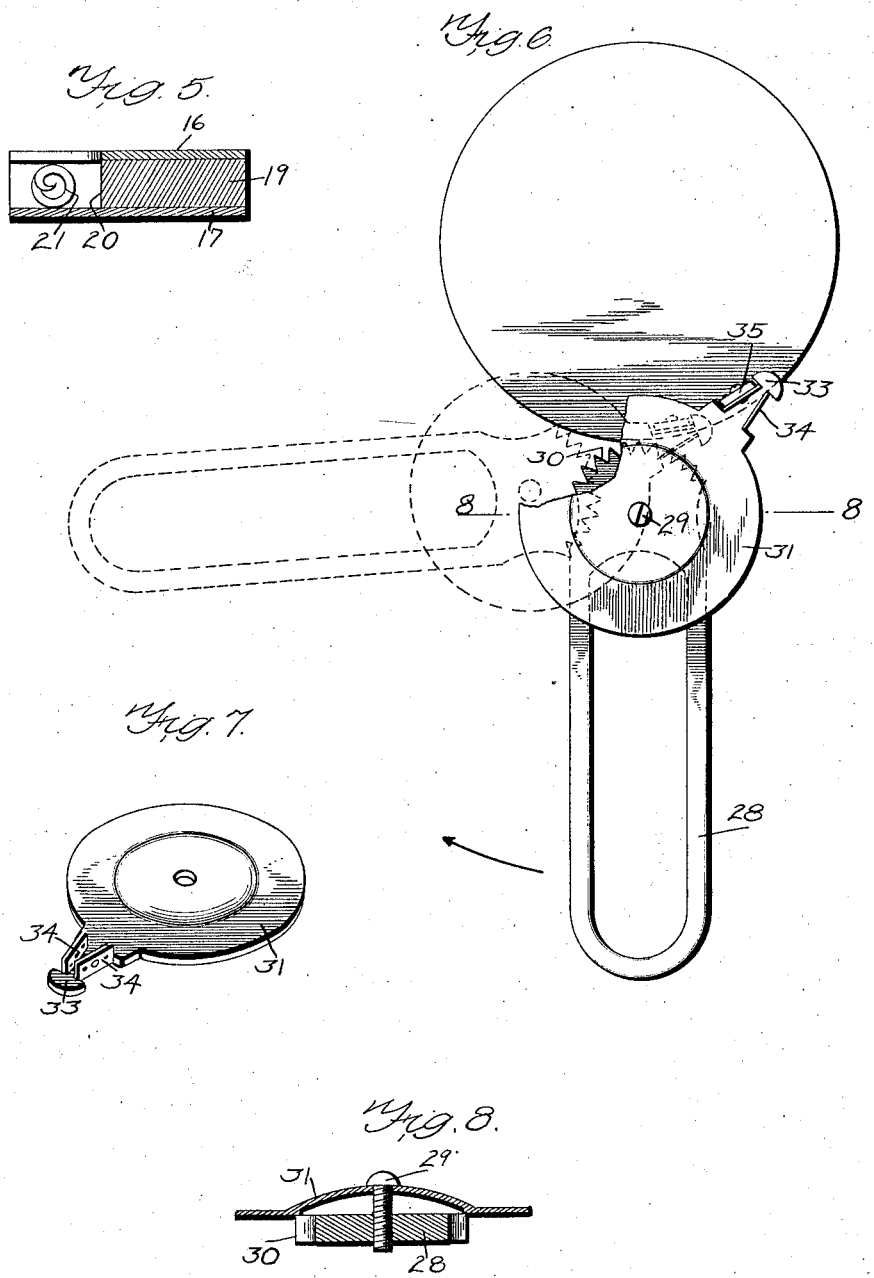

UNITED STATES PATENT OFFICE.

BAYARD GORDON WORTHINGTON, OF MEDFORD, OREGON.

CAN-OPENER.

1,364,016.   Specification of Letters Patent.   Patented Dec. 28, 1920.

Application filed May 21, 1919. Serial No. 298,703.

*To all whom it may concern:*

Be it known that I, BAYARD G. WORTHINGTON, a citizen of the United States, and a resident of Medford, in the county of Jackson and State of Oregon, have invented certain new and useful Improvements in Can-Openers, of which the following is a specification.

My present invention relates generally to can openers, and more particularly to an opener having a pair of knives and movable in either direction around the top of a can for the usual purpose, my object being the provision of a simple, convenient implement of this character thus adapted for either right or left-handed persons, as well as for the use of one knife after the other has become dulled through continual cutting.

With the above general objects in mind, my invention resides in the particular features of construction, arrangement and operation to be now described with respect to the accompanying drawings, forming a part of this specification, and wherein:—

Figure 1 is a top plan view illustrating the practical application of my invention used to proceed in one direction around a can, Fig. 2 is a similar view showing the implement disposed to move around a can in the opposite direction, Fig. 3 is a vertical longitudinal section through the implement removed, Fig. 4 is an enlarged perspective view of the complete implement, Fig. 5 is a cross section taken on line 5—5 of Fig. 2 and enlarged, Fig. 6 is a top plan view illustrating a modified form of implement, Fig. 7 is a detail perspective view of the cutter holding member of Fig. 6, and Fig. 8 is a transverse section taken through the implement of Fig. 6, substantially on line 8—8 of said figure.

Referring now to these figures, my invention as illustrated in Figs. 1 to 5 inclusive, proposes an implement including a handle generally indicated at 15 and consisting of oppositely disposed side plates 16 and 17 connected in spaced apart relation by rivets and the like 18, with an intermediate filler 19 which, for certain purposes, may be cut away at one side as indicated at 20 for the purpose of housing in its inactive position a cork-screw 21 pivoted at one end at 22, to the side plates 16 and 17.

One of the side plates, for instance, the side plate 16, may also be provided with an upset angular portion 22, forming an offset tongue which may be used to remove metal caps from bottles.

These last two features, with respect to the bottle cap remover and the cork screw, are incidental to the main invention which proposes the provision of can-engaging teeth at one end of the handle 15 in connection with cutters and a cutter-holding member pivotally attached to the handle. As seen particularly in Figs. 1, 2 and 3, the two side plates 16 and 17 are extended at one end of the handle beyond the respective end of the filler 19, and receive therebetween one end of an extension piece 23 which forms a cutter holding member, this member, being pivotally connected by virtue of a pivot pin 24 which extends through the side plates 16 and 17 and which also projects through a peripherally toothed wheel 25. This toothed wheel 25 is, however, rigidly connected to the handle, although in adjustable relation, by a clamping screw 26 threaded through the side plate 17, and the wheel 25 thus presents a toothed surface for engagement with the edge of a can adjacent to its top, in addition to the fact that by virtue of being a wheel and adjustable, it may be shifted from time to time in order to bring a new portion of its toothed periphery at the extreme end of the handle for engagement with a cam.

The extension piece 23, forming a cutter holding member, is provided at its opposite side and adjacent its free end, with a pair of cut-out portions in which the inner end of cutters 27 are secured, each of these cutters being of the spear shape shown, so that they may be made to proceed through the material of the can top in either direction, and are thus reversible, as well as capable of use in either direction around the can top.

It is obvious that the implement as thus described, and as shown in Figs. 1 to 5 inclusive, may be used in connection with the cutting of a can top, by simply forcing one of the cutters downwardly through the can top adjacent to the peripheral edge of the can, after which the handle 15 is pressed endwise toward the can in order to firmly engage its toothed wheel 25 with the can edge. Then by partially rotating the handle in the direction in which the cutter-holding member 23 projects, and this may be either direction, the said member will be advanced. The handle 15 is then slightly withdrawn with respect to the can and rotated in the opposite direction, after which it is again pressed against the can and the same operation repeated, subsequent to the taking of a fresh grip on the can.

As seen in Figs. 6, 7 and 8, the form of invention here illustrated proposes a handle in a single piece, as indicated at 28, having one end curved in the arc of a circle, whose center is a threaded opening, receiving a pivot screw 29, this curved extremity having teeth 30 for engagement with a can edge. The cover holding member in this case is in the form of an enlarged disk 31 which overlies the toothed end of the handle and has a central opening 32 as seen in Fig. 7, through which the pivot screws 29 project. This disk 31 is also provided at one point of its periphery with a projecting portion 33 having its opposite side cut away and portions thereof bent into upright positions, as indicated at 34, thus forming cutter receiving slots and walls to which the cutters, one of which is seen at 35 in Fig. 6, may be secured.

In operation, the implement of Figs. 6, 7 and 8, last described, is used in a manner similar to that of Figs. 1 to 5 inclusive, and while it does not include an adjustable tooth member, it is obvious that the teeth 30 of the handle 28 of Fig. 6, may be readily sharpened with a file and this form otherwise presents all of the advantages of Figs. 1 and 2 as to the actual cutting of the can top.

The cutters 35 being similar to the cutters 27 before described, and being reversible with the cutter holding disk 31, similar to the reversal of the cutter holding member 23 first above described, so that the cutting of the can may proceed in either direction, as described.

I claim:—

A can opener comprising a handle having a pivot at one end and a curved series of can engaging teeth projecting radially with respect to said pivot, a cutter holding member engaged by the pivot to the said end of the handle adjacent the teeth, and a pair of cutters carried by said member at relatively opposite sides thereof whereby the can opener can be used in relatively opposite directions, the said cutter holding member having side recesses in which portions of the said cutters are secured in braced relation.

BAYARD GORDON WORTHINGTON.